(12) United States Patent
Liu et al.

(10) Patent No.: US 9,425,616 B2
(45) Date of Patent: Aug. 23, 2016

(54) RC TRIGGERED ESD PROTECTION DEVICE

(75) Inventors: Yen-Lin Liu, Taichung (TW); Kuo-Ji Chen, Wu-Ku (TW); Tzu-Yi Yang, Taipei (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 83 days.

(21) Appl. No.: 13/184,290

(22) Filed: Jul. 15, 2011

(65) Prior Publication Data

US 2013/0016445 A1    Jan. 17, 2013

(51) Int. Cl.
 *H02H 9/00*    (2006.01)
 *H02H 9/04*    (2006.01)
 *H02H 3/22*    (2006.01)

(52) U.S. Cl.
 CPC ................................. *H02H 9/046* (2013.01)

(58) Field of Classification Search
 CPC ....................................................... H02H 9/046
 USPC .................................................... 361/56, 111
 See application file for complete search history.

(56) References Cited

U.S. PATENT DOCUMENTS

| | | | | |
|---|---|---|---|---|
| 4,935,645 | A * | 6/1990 | Lee ................................... | 327/88 |
| 6,510,033 | B1 * | 1/2003 | Maloney et al. ............... | 361/111 |
| 6,690,561 | B2 | 2/2004 | Hung et al. | |
| 7,079,369 | B2 * | 7/2006 | Hulfachor et al. ............ | 361/111 |
| 7,102,862 | B1 * | 9/2006 | Lien et al. ........................ | 361/56 |
| 7,570,468 | B2 * | 8/2009 | Bernard et al. ................. | 361/56 |
| 7,825,445 | B2 * | 11/2010 | Covington ..................... | 257/295 |
| 7,978,451 | B2 * | 7/2011 | Mergens et al. ................ | 361/56 |
| 2005/0253661 | A1 * | 11/2005 | Lee ................................. | 331/185 |
| 2005/0285657 | A1 | 12/2005 | Watt | |
| 2006/0103998 | A1 * | 5/2006 | Smith ........................... | 361/91.1 |
| 2010/0039743 | A1 * | 2/2010 | Lin et al. ....................... | 361/111 |

* cited by examiner

*Primary Examiner* — Thienvu Tran
*Assistant Examiner* — Lucy Thomas
(74) *Attorney, Agent, or Firm* — Slater Matsil, LLP (57) ABSTRACT

An RC triggered ESD protection device comprises a discharge transistor, a driver circuit and a trigger circuit. The trigger circuit comprises a plurality of native NMOS transistors connected in parallel with a plurality of PMOS transistors operating as resistors. The relatively small resistance of the plurality of native NMOS transistors helps to keep a stable RC time constant value so that the ESD protection device can avoid a leakage current during a power up operation.

20 Claims, 6 Drawing Sheets

| |
|---|
| C1: A plurality of MOS capacitors connected in parallel |
| Resistance element: A plurality of NMOS transistors connected in series |
| N3: A plurality of native NMOS transistors connected in parallel |
| N3: A plurality of native NMOS transistors connected in series |
| N2: A plurality of NMOS/PMOS transistors connected in parallel |
| 102: odd number inverters connected in cascade |
| 102: even number inverters connected in cascade |

RC TRIGGERED ESD PROTECTION DEVICE

BACKGROUND

Electrostatic Discharge (ESD) is a rapid discharge that flows between two objects due to the built-up of static charge. ESD may destroy semiconductor devices because the rapid discharge can produce a relatively large current. In order to reduce the semiconductor failures due to ESD, ESD protection circuits have been developed to provide a current discharge path. When an ESD event occurs, the discharge current is conducted through the discharge path without going through the internal circuits to be protected.

In the semiconductor technology, resistor-capacitor (RC) triggered ESD protection circuits are widely used. An RC triggered ESD protection circuit may comprise a discharge transistor, a driver and an ESD spike detection circuit. The ESD spike detection circuit may include a resistance element and a capacitance element connected in series to form an RC detection circuit. The node between the resistance element and the capacitance element is coupled to the gate of the discharge transistor via the driver. The time constant formed by the resistance element and the capacitance element is so chosen that the discharge transistor is turned off when the ESD protection device operates in a normal power up mode. On the other hand, the discharge transistor is turned on when an ESD spike occurs at a power bus to which the ESD protection circuit is coupled. The turn-on of the discharge transistor may provide a bypass of the ESD current from the power bus to ground so as to clamp the voltage of the power bus to a level below the maximum rating voltage to which the internal circuit is specified, so that it helps to prevent the large voltage spike from damaging the internal circuits being protected.

In order to achieve a robust ESD protection and avoid false triggering, the RC time constant of a trigger circuit is chosen between the rise time of an ESD voltage spike and the rise time of a normal power up. When the RC time constant is not set correctly, the discharge transistor is turned on during a normal power up condition. Consequently, a leakage current may occur.

Power consumption has become an important performance index of semiconductor integrated circuits. The leakage current from ESD protection circuit may cause unnecessary power losses. By employing a low leakage current ESD protection circuit, the total power consumption of a semiconductor chip can be improved.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, a resistor-capacitor (RC) triggered Electrostatic Discharge (ESD) protection circuit. The invention may also be applied, however, to a variety of ESD protection circuits.

Figure 1:
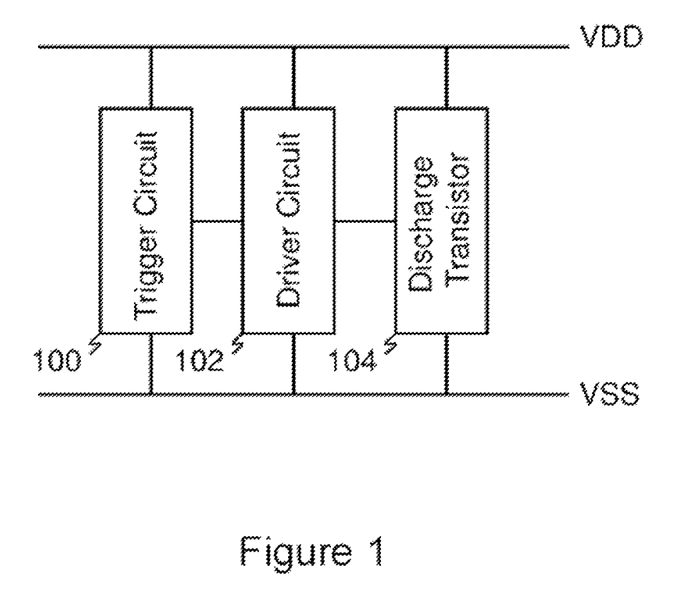
FIG. 1 illustrates a block diagram of an Electrostatic Discharge (ESD) protection device in accordance with an embodiment.

Referring initially to FIG. 1, a block diagram of an ESD protection device is illustrated in accordance with an embodiment. The ESD protection device comprises a trigger circuit 100, a driver circuit 102 and a discharge transistor 104. As shown in FIG. 1, the ESD protection device is coupled between a first voltage potential VDD and a second voltage potential VSS. More particularly, each block of the ESD protection device (e.g., trigger circuit 100) has a first terminal coupled to the first voltage potential VDD and a second terminal coupled to the second voltage potential VSS. Furthermore, the trigger circuit 100 has an output coupled to the discharge transistor 104 via the driver circuit 102.

When an ESD voltage spike is applied between the first voltage potential VDD and the second voltage potential VSS, the trigger circuit 100 may detect the voltage spike and subsequently turn on the discharge transistor 104 via the driver circuit 102. The turn-on of the discharge transistor 104 forms a path in which a large current is allowed to flow from the first voltage potential VDD to the second voltage potential VSS. The current path from the first voltage potential VDD to the second voltage potential VSS may provide a bypass of the ESD current and clamp the voltage between the first voltage potential VDD and the second voltage potential VSS to a level below the maximum rating voltage of the internal circuit (not shown), so that it helps to prevent the large voltage spike from damaging the internal circuits being protected.

Figure 2:
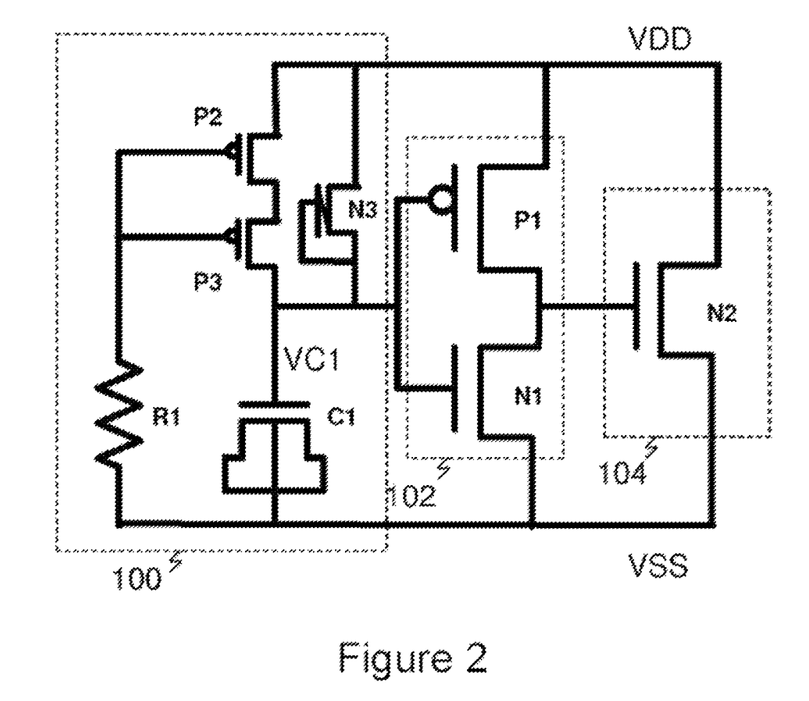
FIG. 2 illustrates in detail a schematic diagram of the ESD protection device shown in FIG. 1.

FIG. 2 illustrates in detail a schematic diagram of the ESD protection device shown in FIG. 1. In accordance with an embodiment, the driver circuit 102 is an inverter comprising a first p-type metal oxide semiconductor (PMOS) transistor P1 and a first n-type metal oxide semiconductor (NMOS) transistor N1 connected in series between the first voltage potential VDD and the second voltage potential VSS. The driver circuit 102 receives a signal from the output of the trigger circuit 100 and sends an inverted signal to the gate of the discharge transistor 104. The discharge transistor 104 may be implemented by a NMOS transistor N2, which has a drain coupled to the first voltage potential VDD, a source coupled to the second voltage potential VSS and a gate coupled to the output of the driver circuit 102.

It should be noted that while FIG. 2 illustrates a single inverter, the driver circuit 102 may accommodate any number of inverters connected in cascade. It should further be noted that the driver circuit 102 is a simplified diagram illustrating the operation of driving a discharge transistor according to an embodiment of the present invention. This diagram is merely an example, which should not unduly limit the scope of the claims. One of ordinary skill in the art would recognize many variations, alternatives, and modifications. For example, one skilled in the art will recognize that other configurations for a driver, including differing numbers of driver stages, can be employed. More particularly, when the discharge transistor is an NMOS transistor, an odd number of inverters may be employed to form the driver circuit. On the other hand, when the discharge transistor is a PMOS transistor, an even number of inverters may be employed to form the driver circuit.

Figure 3A:
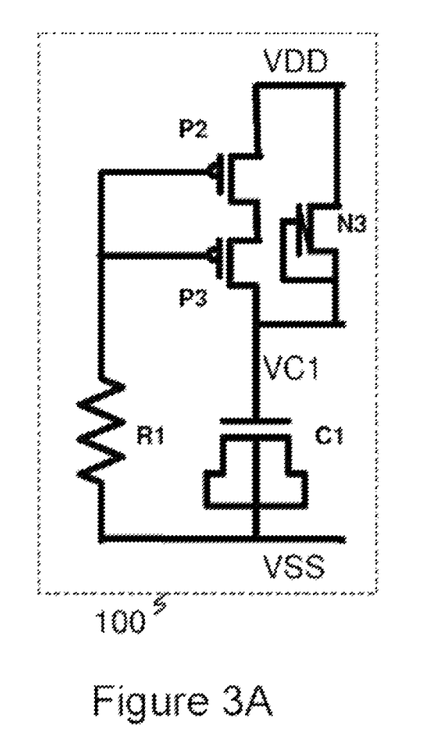
FIG. 3A illustrates a schematic diagram of the trigger circuit shown in FIG. 2.

The trigger circuit 100 is an RC trigger circuit wherein a second PMOS transistor P2, a third PMOS transistor P3, a third NMOS transistor N3 and a resistor R1 form an equivalent resistor. The detailed operation of the equivalent resistor will be described below with respect to FIG. 3. It should be noted that, as known in the art, both gate-grounded PMOS transistors and gate-to-power NMOS transistors behave like resistors. Therefore, the gate-grounded PMOS transistor (e.g., PMOS transistor P2) can be replaced by a gate-to-power NMOS transistor. It should further be noted that while FIG. 2 illustrates the trigger circuit 100 with two PMOS transistors connected in series, the trigger circuit 100 could accommodate any number of PMOS transistors. For example, in accordance with an embodiment, in order to form a 2 MΩ resistor, fifteen PMOS transistors are connected in series between VDD and VC1. Each PMOS transistor has a channel length of 2 μm and a channel width of 0.3 μm.

The trigger circuit 100 further comprises a capacitor C1 connected in series with the equivalent resistor. In accordance with an embodiment, the capacitor C1 can be implemented by connecting a drain and a source of an NMOS transistor together as shown in FIG. 2. It should further be noted that while FIG. 2 illustrates the capacitor C1 is formed by a single NMOS capacitor, the capacitor C1 may be formed by any number of NMOS capacitors connected in parallel. For example, in accordance with an embodiment, in order to form a 90 picofarad capacitor, twenty NMOS transistors are connected in parallel between VC1 and VSS. Each NMOS transistor has a channel width of 3.915 μm and a channel length of 0.55 μm.

During normal operation, the capacitor C1 is fully charged to a logic high state. As a result, the inverter 102 generates a logic low state, which firmly turns off the discharge transistor 104 so that there is no leakage current flowing from the first voltage potential VDD to the second voltage potential VSS. As known in the art, the RC time constant of the trigger circuit 100 is in the microsecond range or even hundreds of nanoseconds such as 0.1 uS, which can prevent false triggering during a normal power up whose rise time is in the range of milliseconds. On the other hand, the RC trigger circuit can generate an ESD trigger signal when an ESD voltage spike having nanoseconds rise time is applied to the rail VDD. For example, when a voltage spike occurs at the rail VDD, during the rise time of the voltage spike the capacitor C1 stays low because the longer RC time constant of the trigger circuit causes a slow increase of the voltage of the capacitor C1. As a result, the driver circuit 102 generates a logic high state at the gate of the discharge transistor 104. The subsequent turn-on of the discharge transistor 104 provides an ESD current path so that the voltage at rail VDD will be clamped a level below the maximum rating voltage to which the voltage rail VDD is specified.

FIG. 3A illustrates a schematic diagram of the trigger circuit 100 shown in FIG. 2. The second PMOS transistor P2 and the third PMOS transistor P3 are connected in series. Both gates of the second PMOS transistor P2 and the third PMOS transistor P3 are coupled to ground via a resistor R1. The resistor R1 is so chosen that the current from both gates to VSS is limited when both PMOS transistors P2 and P3 are damaged during a severe ESD event. In accordance with an embodiment, while not a limitation on the scope of the presently claimed invention, it is believed that the resistor R1 in the range of zero ohms to several hundred ohms would be preferable.

The third NMOS transistor N3 is a native NMOS transistor. According to an embodiment, the native NMOS transistor may have a channel width of 0.5 μm and a channel length of 2 μm. As known in the art, a native NMOS transistor has a low threshold voltage (almost zero). The native NMOS transistor can be considered as a weak pull-up resistor. The electrical characteristics of the third NMOS transistor N3 will be described below with respect to FIG. 3B. As such, the second PMOS transistor P2 and the third PMOS transistor P3 form a pseudo resistor. The pseudo resistor and the weak pull-up resistor derived from the third NMOS transistor N3 further form a resistance element of the trigger circuit 100.

Figure 3B:
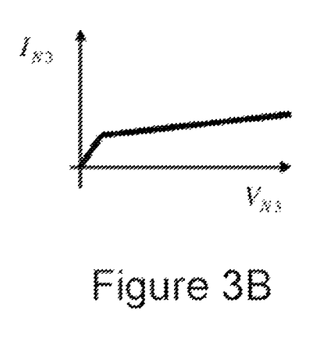
FIG. 3B and FIG. 3C illustrate the IV characteristics of a native NMOS transistor and a PMOS transistor respectively.
Figure 3C:
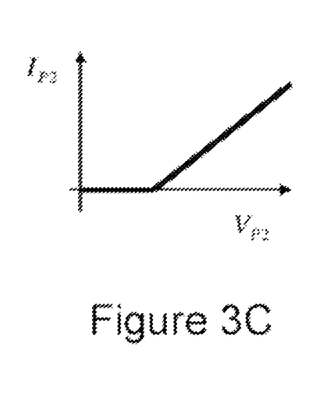

FIG. 3B and FIG. 3C illustrate the IV characteristics of the third NMOS transistor N3 and the second PMOS transistor P2 respectively. As shown in FIG. 3C, before the second PMOS transistor P2 is turned on, the IV characteristics curve shows the PMOS transistor P2 may be of a large resistance value. The third PMOS transistor P3 may have the same characteristics, and hence is discussed herein to avoid repetition. As indicated by FIG. 3C, the pseudo resistor formed by the second PMOS transistor P2 and the third PMOS transistor P3 is relatively large before the second PMOS transistor P2 and the third PMOS transistor P3 are turned on. Consequently, the time constant formed by the pseudo resistor and the capacitor C1 is large. The longer time constant may cause a leakage current during a normal power up. As known in the art, the rise time of a normal power up is in the millisecond range. If the time constant of the trigger circuit is more than the rise time of a power up, the voltage increase at the capacitor C1 may lag the voltage increase of VDD and the voltage at the capacitor C1 may stay low for a while. In response to the low voltage at the capacitor C1, the driver circuit 102 (not shown but illustrated in FIG. 2) generates a logic high state at the gate of the discharge transistor 104 (not shown but illustrated in FIG. 2). As a result, the discharge transistor 104 is turned on and a leakage current flows from the first voltage potential VDD to the second voltage potential VSS.

The IV characteristics of the third NMOS transistor N3 is illustrated in FIG. 3B. As illustrated by the IV curve in FIG. 3B, the equivalent resistance of the third NMOS transistor N3 is relatively small in comparison with the corresponding portion of the second PMOS transistor P2. In other words, during a power up, when the voltage between VDD and VC1 is relatively small, the equivalent resistance of the third NMOS transistor N3 is smaller than that of the second PMOS transistor P2. By paralleling the third NMOS transistor N3 with the second PMOS transistor P2 and the third PMOS transistor P3, the total resistance derived from P2, P3 and N3 may be lowered so that the leakage current flowing through the discharge transistor 104 can be avoided.

Figure 4A:
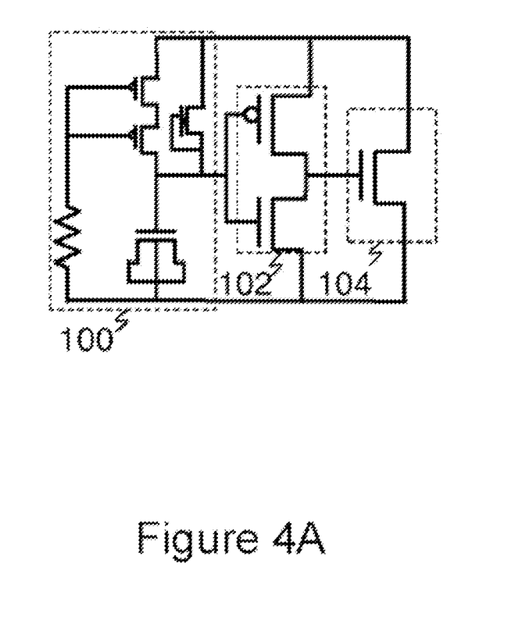
FIGS. 4A-4C illustrate three different types RC triggered ESD protection devices.
Figure 4B:
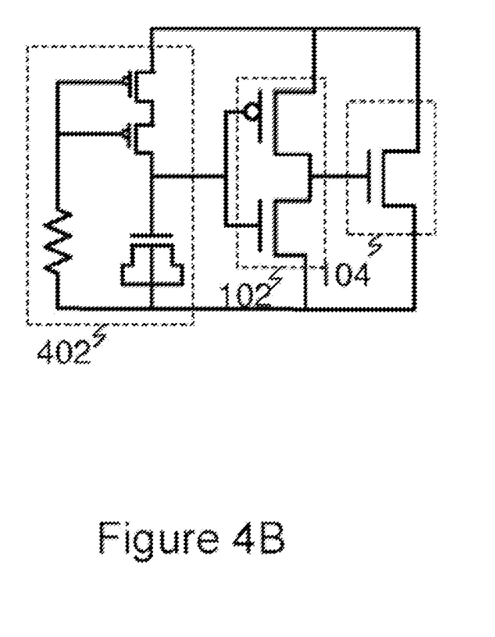
Figure 4C:
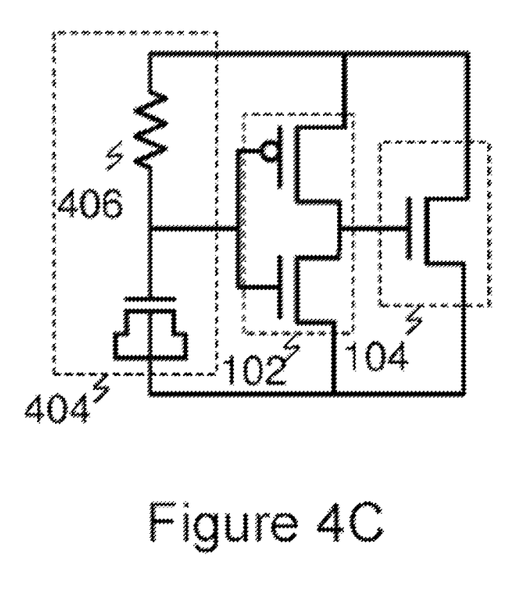

FIGS. 4A, 4B and 4C illustrate three different types of RC trigger ESD protection devices. FIG. 4A has been described in detail with respect to FIG. 2, and hence is not discussed to avoid repetition. The trigger circuit 402 in FIG. 4B has similar structure as the corresponding portion of FIG. 4A except that the native NMOS transistor is not included. The trigger circuit in FIG. 4C employs a thick oxide region (OD) resistor or a poly resistor to replace the PMOS equivalent resistor shown in FIG. 4A and FIG. 4B.

Figure 4D:
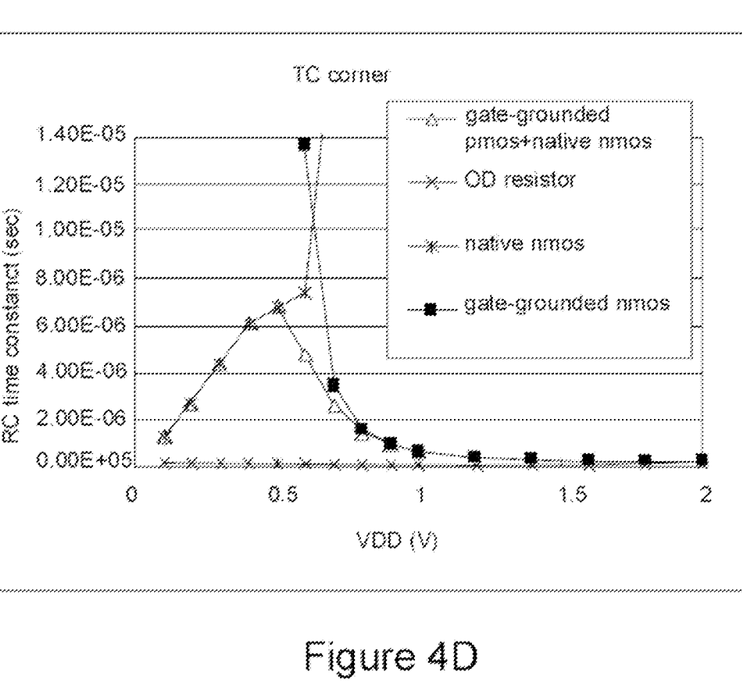
FIG. 4D illustrates the relationships between the time constant and the voltage across the trigger circuit under different RC triggered ESD protection devices shown in FIGS. 4A-4C.

FIG. 4D illustrates the relationships between the time constant and the voltage across the trigger circuit under different trigger circuits. The horizontal axis of FIG. 4D represents the supply voltage at VDD. The vertical axis of FIG. 4 represents the time constant of the RC trigger circuit. Since the value the capacitor C1 is almost fixed, the time constant change is proportional to the resistance change of the RC trigger circuits. As shown in FIG. 4D, when the trigger circuit of FIG. 4B is employed, the time constant is relatively large. For example, the time constant is approximately 14 microseconds when VDD is around 0.5V. The large time constant may cause a slow voltage increase at the input of the driver circuit. As a result, the driver circuit may generate a logic high state, which may further cause a leakage current by turning on the discharge transistor 104. When an OD resistor is employed, the OD resistor curve shows the time constant formed by the OD resistor is small so that the OD resistor based trigger circuit (shown in FIG. 4C) may not cause a leakage current. The native NMOS transistor has a small resistance value when VDD is less than 0.5V. As a result, connecting the native NMOS transistor and gate grounded PMOS transistors may form a small resistance value. As shown in FIG. 4D, the time constant of the RC trigger circuit of FIG. 4A is smaller than that of FIG. 4B. The small time constant helps to firmly turn off the discharge transistor when the ESD device operates in a power up mode. It should be noted that the native NMOS transistor not only helps to maintain a small resistance value, but also helps to provide a stable time constant value when the ESD device operates in a power up mode.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A device comprising:
a native n-type metal oxide semiconductor (NMOS) transistor having a first drain/source region directly connected to a first voltage potential and a second drain/source region directly connected to a first terminal of a capacitor, wherein a gate of the native NMOS transistor is connected to the first terminal of the capacitor, and wherein parameter values of the native NMOS transistor are selected such that the native NMOS transistor functions as a pull-up resistor;
a resistance element connected between the first voltage potential and the first terminal of the capacitor, wherein the resistance element comprises at least a p-type metal oxide semiconductor (PMOS) transistor, and wherein the resistance element has at least two resistance values, and wherein a first resistance value of the resistance element is greater than a resistance value of the pull-up resistor, and a second resistance value of the resistance element is less than the resistance value of the pull-up resistor; and
the capacitor having a second terminal coupled to a second voltage potential, wherein the first voltage potential is higher than the second voltage potential, and wherein the native NMOS transistor, the resistance element and the capacitor form an electrostatic discharge (ESD) trigger circuit.

2. The device of claim 1, wherein the capacitor is formed by a plurality of metal oxide semiconductor (MOS) capacitors connected in parallel.

3. The device of claim 1, wherein the resistance element comprises a plurality of p-type metal oxide semiconductor (PMOS) transistors connected in series, each of which having a gate coupled to the second voltage potential.

4. The device of claim 3, further comprising a resistor coupled between the gates of the plurality of PMOS transistors and the second voltage potential.

5. The device of claim 1, wherein the resistance element comprises a plurality of NMOS transistors connected in series, each of which having a gate coupled to the first voltage potential.

6. The device of claim 5, further comprising a resistor coupled between the gates of the plurality of NMOS transistors and the first voltage potential.

7. The device of claim 1, wherein the native NMOS transistor comprises a plurality of native NMOS transistors connected either in parallel or in series.

8. A system comprising:
a discharge transistor coupled between a first voltage potential and a second voltage potential;
a driver circuit generating an output signal fed to a gate terminal of the discharge transistor; and
a trigger device having an output coupled to the driver circuit comprising:
a native n-type metal oxide semiconductor (NMOS) transistor having a first drain/source region directly connected to the first voltage potential and a second drain/source region directly connected to a first terminal of a capacitor, wherein a gate of the native NMOS transistor is connected to the first terminal of the capacitor, and wherein parameter values of the native NMOS transistor are selected such that the native NMOS transistor functions as a pull-up resistor;
a resistance element connected between the first voltage potential and the first terminal of the capacitor, wherein the resistance element comprises at least a p-type metal oxide semiconductor (PMOS) transistor, and wherein the resistance element has at least two resistance values, and wherein a first resistance value of the resistance element is greater than a resistance value of the native NMOS transistor, and a second resistance value of the resistance element is less than the resistance value of the native NMOS transistor; and
the capacitor having a second terminal coupled to the second voltage potential, wherein the first voltage potential is higher than the second voltage potential.

9. The system of claim 8, wherein the discharge transistor comprises a plurality of NMOS transistors connected in parallel.

10. The system of claim 9, wherein the driver circuit comprises an odd number of inverters connected in cascade.

11. The system of claim 8, wherein the discharge transistor comprises a plurality of p-type metal oxide semiconductor (PMOS) transistors connected in parallel.

12. The system of claim 11, wherein the driver circuit comprises an even number of inverters connected in cascade.

13. The system of claim 8, wherein the driver circuit is an inverter comprising:
 a PMOS transistor having a source coupled to the first voltage potential; and
 a NMOS transistor having a drain coupled to a drain of the PMOS transistor, a source coupled to the second voltage potential and a gate coupled to a gate of the PMOS transistor.

14. The system of claim 8, wherein the trigger device, the driver circuit and the discharge transistor are configured such that:
 a current flows through the discharge transistor when an Electrostatic Discharge (ESD) spike is applied to the first voltage potential; and
 the discharge transistor is turned off when the system operates in a power up mode.

15. An Electrostatic Discharge (ESD) clamp comprising:
 a resistor-capacitor (RC) trigger circuit coupled between a first voltage potential and a second voltage potential comprising:
 a capacitor formed by a plurality of metal oxide semiconductor (MOS) capacitors, wherein the capacitor has a first terminal coupled to the second voltage potential; and
 a resistance element comprising a plurality of MOS transistors and a plurality of native transistors, wherein the plurality of native transistors are connected in parallel with the plurality of MOS transistors, and wherein the resistance element has a terminal directly connected to the first voltage potential and the first voltage potential is higher than the second voltage potential, and wherein gates of the plurality of native transistors are directly connected to a second terminal of the capacitor, wherein the resistance element has at least two resistance values, and wherein a first resistance value of the plurality of MOS transistors is greater than a resistance value of the plurality of native transistors, and a second resistance value of the MOS transistors is less than the resistance value of the plurality of native transistors, and wherein parameter values of the plurality of native transistors are selected such that the plurality of native transistors function as a pull-up resistor;
 a driver circuit receiving an ESD protection signal from the RC trigger circuit; and
 a discharge transistor having a gate coupled to an output of the driver circuit.

16. The ESD clamp of claim 15, wherein the discharge transistor, the RC trigger circuit and the driver circuit are coupled between the first voltage potential and the second voltage potential.

17. The ESD clamp of claim 16, wherein the trigger circuit, the driver circuit and the discharge transistor are configured such that:
 a current flows through the discharge transistor from the first voltage potential to the second voltage potential when an ESD spike is applied to the first voltage potential; and
 the discharge transistor is turned off when the ESD clamp is under a power up operation.

18. The ESD clamp of claim 15, wherein
 the driver circuit comprises an odd number of inverters when the discharge transistor comprises a plurality of n-type metal oxide semiconductor (NMOS) transistors connected in parallel; and
 the driver circuit comprises an even number of inverters when the discharge transistor comprises a plurality of p-type metal oxide semiconductor (PMOS) transistors connected in parallel.

19. The ESD clamp of claim 15, wherein
 the discharge transistor is turned off when the ESD clamp operates in a power up mode; and
 the discharge transistor is turned on when an ESD spike is applied to the ESD clamp.

20. The ESD clamp of claim 15, further comprising a resistor coupled between the plurality of MOS transistors and ground.

* * * * *